`United States Patent Office`

2,698,326
Patented Dec. 28, 1954

2,698,326

5-AMINOMETHYLPYRIMIDINES

Hans Suter, Dorflingen, and Ernst Habicht, Schaffhausen, Switzerland, assignors to Cilag Limited, Schaffhausen, Switzerland, a Swiss company No Drawing. Application June 10, 1953, Serial No. 360,806

Claims priority, application Switzerland June 27, 1952

6 Claims. (Cl. 260—256.4)

This invention relates to new pyrimidine derivatives and a process for their production.

The invention provides a series of new pyrimidine derivatives of the general formula

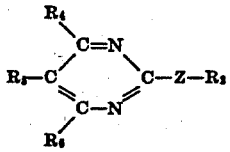

in which $R_2$ is a hydrogen atom, an acyl, aroyl, alkyl or aralkyl radical, $R_4$ is an amino or hydroxy group, $R_5$ is a cyano-, carbalkoxy-, carbamido- or aminomethyl group, $R_6$ is a hydrogen or an alkyl radical and Z is an oxygen or a sulphur atom.

It has been found that compounds of this formula have strong tuberculostatic effects. They are therefore intended for use as remedies, partly also as intermediate products for the production of Schiff's bases with aromatic aldehydes.

The invention also provides a process for the production of the new pyrimidine derivatives by condensing a compound of the formula

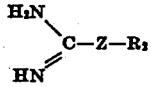     I with a compound containing a radical of the formula

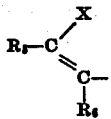     II in which X represents a functional derivative of the carboxyl group containing (a) where $R_4$ in the final product represents an amino group, at least one nitrogen atom
(b) where $R_4$ in the final product represents a hydroxy group, at least one oxygen atom, and if necessary transforming $R_2$ in the reaction product into an acyl or aroyl group by acylation or aroylation, or into an alkyl or aralkyl group by alkylation or aralkylation, or into a hydrogen atom by hydrolysis, and if necessary transforming $R_5$ into a carbamido group by amidation, or into an amino methyl group by reduction.

Compounds which give the radical of the Formula II include: Alkoxy methylene ($R_6$=H) malonic acid derivatives and alkoxy alkylene ($R_6$=alkyl) malonic acid derivatives, for example Dinitriles:
$$(R_5 = X = CN)$$
Diesters:
$$(R_5 = X = COO \text{ alkyl})$$
Esternitriles:
$$(R_5 \text{ or } X = COO \text{ alkyl}; X \text{ or } R_5 = CN)$$
Di-amides:
$$(R_5 = X = CO-NH_2)$$
Ester halides:
$$(R_5 = COO \text{ alkyl}; X = CO-Hal)$$

Ester amidines:

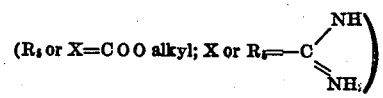

Amidine amides:

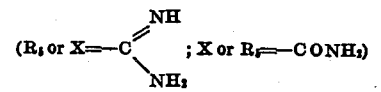

Nitrile-amides:
$$(R_5 \text{ or } X = -CN; X \text{ or } R_5 = -CONH_2)$$

Imido ester amides:

Imido ester esters:

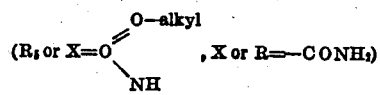

and other reactive derivatives of such malonic acids.

Compounds which contain the radical of the Formula II and carry basic groups may also be used in the form of their acid salts; the amount of alkali which is necessary for the neutralisation of the acid part may be added to the reaction mixture at any time.

Alkylisothioureas and alkylisoureas may be used as such or in the form of their salts as compounds of the Formula I. It is also possible to use free urea of thiourea. In general it has proved quite useful but not absolutely necessary to work in the presence of a solvent or diluent. For this purpose alcohols are very useful, since they enable the necessary amount of alkali to be added to the reaction mass in the form of alcoholates, i. e. under anhydrous conditions.

Where $R_5$ is the cyano group, it can be reduced to the aminomethyl group with the usual reducing agents, e. g. with the aid of Raney nickel, preferably in alcohol saturated with ammonia. Furthermore, the following reducing agents may also be used.

*Lithium aluminium hydride in ether, chromo salts and other reducing agents known to the prior art*

Where $R_5$ is a carbethoxy group it can be amidated preferably with ammonia in aqueous or alcoholic solution or with liquid ammonia, with or without pressure, at high or low temperature.

The transformation of an alkyl or aralkyl radical $R_2$ by hydrolysis into a hydrogen atom can easily be effected in acid solution. The splitting off of an acyl or aroyl radical can take place in acid or alkaline solution.

Where $R_2$ is a hydrogen atom, it can readily be transformed into an acyl or aroyl radical by reacting a compound containing a radical of the formula

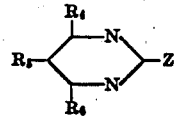     III with a compound yielding the radical $R_2$—.

An acyl halide or aroyl halide or anhydride is preferably reacted with a hydroxy or thiol compound of the Formula III in the presence of a basic condensation agent, or a metal salt is used, preferably an alkaline salt of a hydroxy or thiol compound of the Formula III.

The usual basic condensation agents may be used, e. g. alkali hydroxide, carbonate, bicarbonate, tertiary bases such as pyridine or trialkylamines.

Alkylation or aralkylation is preferably effected with the aid of a reactive ester of an alkanol or aralkanol corresponding to $R_2$ in the presence of basic condensation agents, e. g. alkalis, alkali oxides, alkali hydroxides or carbonates.

Preferred reactive esters are: Hydrohalide esters, and alkyl or arylsulphonic acid esters.

Example 1 o-Methylisourea methoxysulphonate, obtained from 18 gms. of urea and 37.8 gms. of pure dimethyl sulphur, is reacted with 36.6 gms. of ethoxymethylene malodinitrile in 200 cc. of absolute methanol. With shaking and cooling a cold solution of 10.5 gms. of sodium in 250 cc. of absolute methanol is added to this mixture, and the whole is put aside for one day. The precipitated crystals are then recrystallised from hot water. In this way 14–15 gms. of 2-methoxy-4-amino-5-cyano-pyrimidine are obtained, melting at 218–219° C. with decomposition. It exists in colourless glittering leaflets which are easily soluble in diluted hydrochloric acid and sparingly soluble in alkalis.

Example 2

5 gms. of 2-methoxy-4-amino-5-cyano-pyrimidine, obtained according to Example 1, and 4 gms. of lithium aluminium hydride are treated with 400 cc. of absolute tetrahydro furane in a fine jet and with intense stirring. The mixture is stirred at 0° C., for two hours with cooling, then for another two hours at 40–45° C., and then carefully treated with water. The reaction mixture is evaporated to dryness, reacted with hydrochloric acid, boiled for half an hour and distilled. Then it is evaporated nearly to dryness, treated with 125 cc. of acetone and cooled with ice and water. In this way 2 gms. of the di-hydrochloride of 2-hydroxy-4-amino-5-aminomethyl pyrimidine are obtained decomposing at 264–267° C. Yield: 20%.

Example 3

22.2 gms. of S-benzyl isothiourea chloride, 23.8 gms. of ethoxy-methylene malonic acid diethyl ester and 250 cc. of ethanol are reacted with a solution of 5.1 gms. of sodium in 200 cc. of ethanol. The reaction mixture becomes yellow and a crystalline mass separates. After one hour's standing it is heated to boiling for one hour, then the ethanol is distilled off and the residue is treated with 350 cc. of water, 30 cc. of 2 N hydrochloric acid and shaken. After 24 hours the crystals are filtered off with suction and recrystallised from dioxane/water. In this way 23.2 gms. of 2-benzylmercapto-4-hydroxy-5-carbethoxy pyrimidine are obtained melting at 172–173° C. Colourless glittering leaflets which are hardly soluble in cold or hot water, ethanol, ether or acetone, but which in the heat are easily soluble in ethyl acetate, benzene, chloroform and dioxane.

Example 4

2 - benzylmercapto - 4 - hydroxy - 5 - carbethoxy-pyrimidine, obtained according to Example 3, is reduced with lithium aluminium hydride in tetrahydrofurane to the 5-hydroxymethyl compound.

Example 5

In similar manner to that described above, from 26 gms. of ethoxymethylene malonitrile, 44 gms. of S-benzyl-isothiourea chloride and 5 gms. of sodium in a total of 600 cc. of absolute ethanol, 44 gms. of 4-amino-5-cyano-2-benzylmercapto pyrimidine are obtained, melting at 171° C. Colourless crystals, recrystallisable from dioxane/water.

Example 6

From 12.2 gms. of 4-amino-5-cyano-2-benzylmercapto pyrimidine, 5.8 gms. of lithium aluminium hydride and 200 cc. of absolute tetrahydrofurane, 5.2 gms. of 4-amino-5-aminomethyl-2-benzylmercapto pyrimidine are obtained in similar manner. It melts at 116–117° C. Colourless crystals, sparingly soluble in water, easily soluble in the usual organic solvents.

Example 7

From 26 gms. of ethoxymethylene malodinitrile and 41 gms. of S-ethylisothiourea bromide, with the aid of 5 gms. of sodium in 400 cc. of ethanol, 21.5 gms. (56% of the theoretical) of 2-ethyl-mercapto-4-amino-5-cyano-pyrimidine melting at 147° are obtained in a similar way. Colourless crystals, sparingly soluble in water, ethanol and benzene, easily soluble in ether, acetone, acetic ester, chloroform and dioxane, recrystallisable from water, ethanol or benzene.

Example 8

From 16.3 gms. of thiourea, 26 gms. of ethoxymethylene malonitrile and 5 gms. of sodium in a total of 300 cc. of ethanol 21.8 gms. (5% of the theoretical) of 2-mercapto-4-amino-5-cyano pyrimidine decomposing at 320° are obtained in a similar way. Readily soluble in dilute sodium hydroxide, fairly soluble in dilute sodium carbonic solution.

Example 9

10 gms. of 2-mercapto-4-amino-5-cyano pyrimidine, obtained according to Example 8, are added to a solution of 1.5 gms. of sodium in 50 cc. of ethanol. The sodium salt is separated by adding ether, the salt is filtered off with suction and dried. Amount: 11.5 gms. The dried sodium salt is suspended in 100 cc. of absolute dioxane and a solution of 10 gms. of benzoyl chloride in 50 cc. of absolute dioxane is added with stirring. After 5 hours' mechanical stirring at 20° C., the reaction mixture is heated to boiling and then cooled. After diluting with 500 cc. of water, the reaction mass is adjusted to pH7 with sodium hydroxide and the crystalline mass is filtered off with suction. After recrystallisation from acetone/water or acetone/petroleum ether, 10–12 gms. of 2-benzoylmercapto-4-amino-5-cyano pyrimidine are obtained, which melts at 176–179° C. with decomposition. Colourless leaflets, sparingly soluble in water, ether and benzene, fairly soluble in ethanol, acetone and acetic ester. The compound is slowly saponified by boiling with dilute alkali.

Example 10

A solution of 30 gms. of 2-naphthyl methyl mercapto-4-amino-5-cyano pyrimidine in 225 cc. of tetrahydrofurane are added drop by drop with ice-cooling and stirring to a solution of 15 gms. of lithium aluminium hydride in 135 cc. of absolute tetrahydrofurane within an hour. For 2½ hours the mixture is mechanically stirred with ice-cooling, put aside for 24 hours and then carefully treated with a mixture of dioxane/water. The whole is filtered, treated with 300 cc. of 2 N acetic acid and then concentrated in vacuo to about 200 cc. Afterwards it is again diluted with 400 cc. of 2 N acetic acid, filtered with charcoal and the filtrate made alkaline with concentrated sodium hydroxide. The precipitated product is dissolved in 100 cc. of 2 N acetic acid, filtered and again made alkaline with sodium hydroxide. The precipitated substance is dissolved in benzene and precipitated with petroleum ether. In this way 2-(naphthyl-(1')-methyl)-mercapto-4-amino-5-amino-methyl pyrimidine is obtained in colourless needles melting at 118–120° C.

Example 11

From 13 gms. of 2,4-diamino-5-cyano-6-methyl pyrimidine and 11.5 gms. of lithium aluminium hydride in 370 cc. of tetrahydrofurane, 9.5 gms. of the hydrochloride of 2,4-diamino-6-methyl-5-aminomethyl pyrimidine are obtained by working as described in the foregoing examples. When recrystallised from alcohol it melts at 255° C. with decomposition. The free base may be recrystallised from methanol and melts at 175° C. with decomposition.

The following may be obtained in the same manner as described in the foregoing examples:

(a) 2-hydroxy-4-amino-5-cyano pyrimidine, M. P.: 270° C. decomposition. M. P. picrate: 241–242° C.
(b) 2-benzylmercapto-4-amino-5-cyano-6-methyl pyrimidine, M. P.: 193–196° C.
(c) 2 - mercapto - 4 - amino - 5 - aminomethyl - pyrimidine, M. P.: 220° C. decomposition.
(d) 2 - benzylmercapto - 4 - amino - 5 - aminomethyl-6-methyl-pyrimidine, M. P.: 123–123.5° C.

What we claim is:
1. The new chemical compound 2-methoxy-4-amino-5-amino-methyl-pyrimidine.
2. The new chemical compound 2-hydroxy-4-amino-5-amino-methyl-pyrimidine.
3. The new chemical compound 2-benzylmercapto-4-amino-5-aminomethyl-pyrimidine.
4. The new chemical compound 2-(naphthyl-(1')-methyl)-mercapto-4-amino-5-aminomethyl-pyrimidine.

5. The new chemical compound 2-benzylmercapto-4-amino-5-aminomethyl-6-methyl-pyrimidine.

6. New chemical compounds selected from the group consisting of new pyrimidine derivatives of the general formula

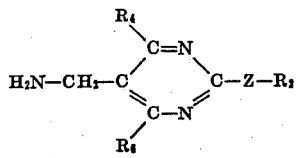

wherein $R_2$ is a substituent selected from the group consisting of hydrogen, a low molecular alkyl radical, a benzyl radical, and a naphthylmethyl radical, $R_4$ is a substituent selected from the group consisting of an amino group and a hydroxyl group, $R_6$ is a substituent selected from the group consisting of hydrogen and a low molecular alkyl radical, and Z is a member selected from the group consisting of oxygen and sulfur, and salts of said pyrimidine derivatives with nontoxic acids.

References Cited in the file of this patent

Wheeler et al., Amer. Chem. Soc. Jour. 40, 237 (1908).